(12) United States Patent
Agarwal et al.

(10) Patent No.: US 12,375,410 B2
(45) Date of Patent: Jul. 29, 2025

(54) POSITION AWARE LOAD BALANCING IN A RING NETWORK

(71) Applicant: Cisco Technology, Inc., San Jose, CA (US)

(72) Inventors: Shruti Agarwal, Milpitas, CA (US); Xiaoguang Jason Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 17/750,194

(22) Filed: May 20, 2022

(65) Prior Publication Data

US 2023/0412510 A1  Dec. 21, 2023

(51) Int. Cl.
*H04L 47/10* (2022.01)
*H04L 47/11* (2022.01)
*H04L 47/125* (2022.01)

(52) U.S. Cl.
CPC .............. *H04L 47/13* (2013.01); *H04L 47/11* (2013.01); *H04L 47/125* (2013.01)

(58) Field of Classification Search
None
See application file for complete search history.

(56) References Cited

U.S. PATENT DOCUMENTS

| 7,126,910 | B1 | 10/2006 | Sridhar |
| 9,813,340 | B2 | 11/2017 | Thubert et al. |
| 10,630,593 | B2 | 4/2020 | Paramasivam |
| 10,757,161 | B2 | 8/2020 | Murgia et al. |
| 11,128,700 | B2 | 9/2021 | Rao et al. |
| 2014/0301185 | A1* | 10/2014 | Chen .................. H04L 41/0659 370/225 |
| 2016/0142264 | A1* | 5/2016 | Sahi ....................... H04L 41/12 370/254 |

OTHER PUBLICATIONS

"EtherNet/IP Device Level Ring", Application Technique, Original Instructions, Rockwell Automation Publication ENET-AT007D-EN-P, Aug. 2021, 92 pages, Rockwell Automation, Inc.

(Continued)

*Primary Examiner* — Christine T Duong
(74) *Attorney, Agent, or Firm* — BEHMKE INNOVATION GROUP LLC; James M. Behmke (57) ABSTRACT

According to one or more embodiments of the disclosure, a supervisory networking device in an Ethernet ring obtains identity information for each of a plurality of other networking devices in the Ethernet ring. The supervisory networking device determines, based on the identity information, a relative position for each of the plurality of other networking devices in the Ethernet ring. The supervisory networking device generates, based on the relative position of each of the plurality of other networking devices in the Ethernet ring, a load balancing configuration for the Ethernet ring. The supervisory networking device implements the load balancing configuration in the Ethernet ring by blocking a first link of the supervisory networking device for a first subset of the plurality of other networking devices and a second link of the supervisory networking device for a second subset of the plurality of other networking devices.

20 Claims, 8 Drawing Sheets

(56) References Cited

OTHER PUBLICATIONS

Moldovansky, et al., "Introduction to Device Level Ring topology for EtherNet/IP", online: https://iebmedia.com/technology/introduction-to-device-level-ring-topology-for-ethernet-ip/, Oct. 5, 2009, accessed Apr. 11, 2022, 17 pages.

"Resilient Ethernet Protocol Overview", online: https://www.cisco.com/c/en/US/support/docs/lan-switching/ethernet/116384-technote-rep-00.pdf, Doc ID: 116384, Jul. 22, 2016, accessed Apr. 11, 2022, 14 pages, Cisco Systems, Inc.

"Configuring a Load-Balancing Scheme", online: https://www.cisco.com/c/en/US/td/docs/ios-XML/ios/ipswitch_cef/configuration/xe-3s/isw-cef-xe-3s-book/isw-cef-load-balancing.pdf, Jan. 20, 2018, accessed Apr. 11, 2022, 16 pages, Cisco Systems, Inc.

Boraah, Drritiman, "8 Load Balancing techniques you should know", online: https://lavellenetworks.com/blog/8-load-balancing-techniques-you-should-know/, 2021, accessed Apr. 11, 2022, 6 pages, Lavellenetworks.

Pepelnjak, Ivan, "Traffic engineering: An introduction", online: https://www.computerweekly.com/tip/Traffic-engineering-An-introduction, Jul. 27, 2007, accessed Apr. 11, 2022, 4 pages, ComputerWeekly, TechTarget.

"Configuring Resilient Ethernet Protocol", online: https://www.cisco.com/c/en/US/td/docs/switches/lan/cisco_ie4010/software/release/15-2_4_EC/configuration/guide/scg-ie4010_5000/swrep.pdf, Feb. 17, 2022, accessed Apr. 11, 2022, 12 pages, Cisco Systems, Inc.

"I.A. Ring / I.A. Chain", online: https://www.ison-tech.com/index.php/technology/ia_ring_chain, accessed Apr. 11, 2022, 5 pages, ISON Technology Co., Ltd.

Nsaif, et al., "LPLB: A Novel Approach for Loop Prevention and Load Balancing in Ethernet Ring Networks", Conference: The 10th KIPS International Conference on Ubiquitous Information Technologies and Applications (CUTE 2015), Lecture Notes in Eelectrical Engineering, Dec. 2015, 9 pages, Cebu, Philippines.

* cited by examiner

POSITION AWARE LOAD BALANCING IN A RING NETWORK

TECHNICAL FIELD

The present disclosure relates generally to computer networks, and, more particularly, to position aware load balancing in a ring network.

BACKGROUND

Operational Technology (OT) networks are typically used to automate processes, such as factories, buildings, etc. Increasingly, OT networks are making use of networking devices that form a ring topology. Indeed, it is now common to see many rings of OT networks connecting various other ring networks or endpoint such as sensors, input/output (I/O) devices, and the like, through the ring topology and back to the enterprise. In general, ring topologies afford additional resiliency to the network, in the case of link failure.

There are many protocols available for managing ring network topologies such as DLR (Device Level Ring), EAPS (Ethernet Automatic Protection Switching), MRP (Media Redundancy Protocol), etc. These protocols function with the help of a supervisory (e.g., master) node. The supervisory node can monitor the health of the ring network and break the loop by blocking network traffic on a specific link in the ring network. As a result, all the traffic entering the ring is pushed along the unblocked link. Similarly, all outgoing traffic is sent along the ring towards the unblocked link, as well. However, doing so also greatly increases the load along the path, particularly on those links closest to the supervisory node.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a supervisory networking device in an Ethernet ring obtains identity information for each of a plurality of other networking devices in the Ethernet ring. The supervisory networking device determines, based on the identity information, a relative position for each of the plurality of other networking devices in the Ethernet ring. The supervisory networking device generates, based on the relative position of each of the plurality of other networking devices in the Ethernet ring, a load balancing configuration for the Ethernet ring. The supervisory networking device implements the load balancing configuration in the Ethernet ring by blocking a first link of the supervisory networking device for a first subset of the plurality of other networking devices and a second link of the supervisory networking device for a second subset of the plurality of other networking devices.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:
  1) Links are generally lossy, such that a Packet Delivery Rate/Ratio (PDR) can dramatically vary due to various sources of interferences, e.g., considerably affecting the bit error rate (BER);
  2) Links are generally low bandwidth, such that control plane traffic must generally be bounded and negligible compared to the low rate data traffic;
  3) There are a number of use cases that require specifying a set of link and node metrics, some of them being dynamic, thus requiring specific smoothing functions to avoid routing instability, considerably draining bandwidth and energy;
  4) Constraint-routing may be required by some applications, e.g., to establish routing paths that will avoid non-encrypted links, nodes running low on energy, etc.;
  5) Scale of the networks may become very large, e.g., on the order of several thousands to millions of nodes; and
  6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
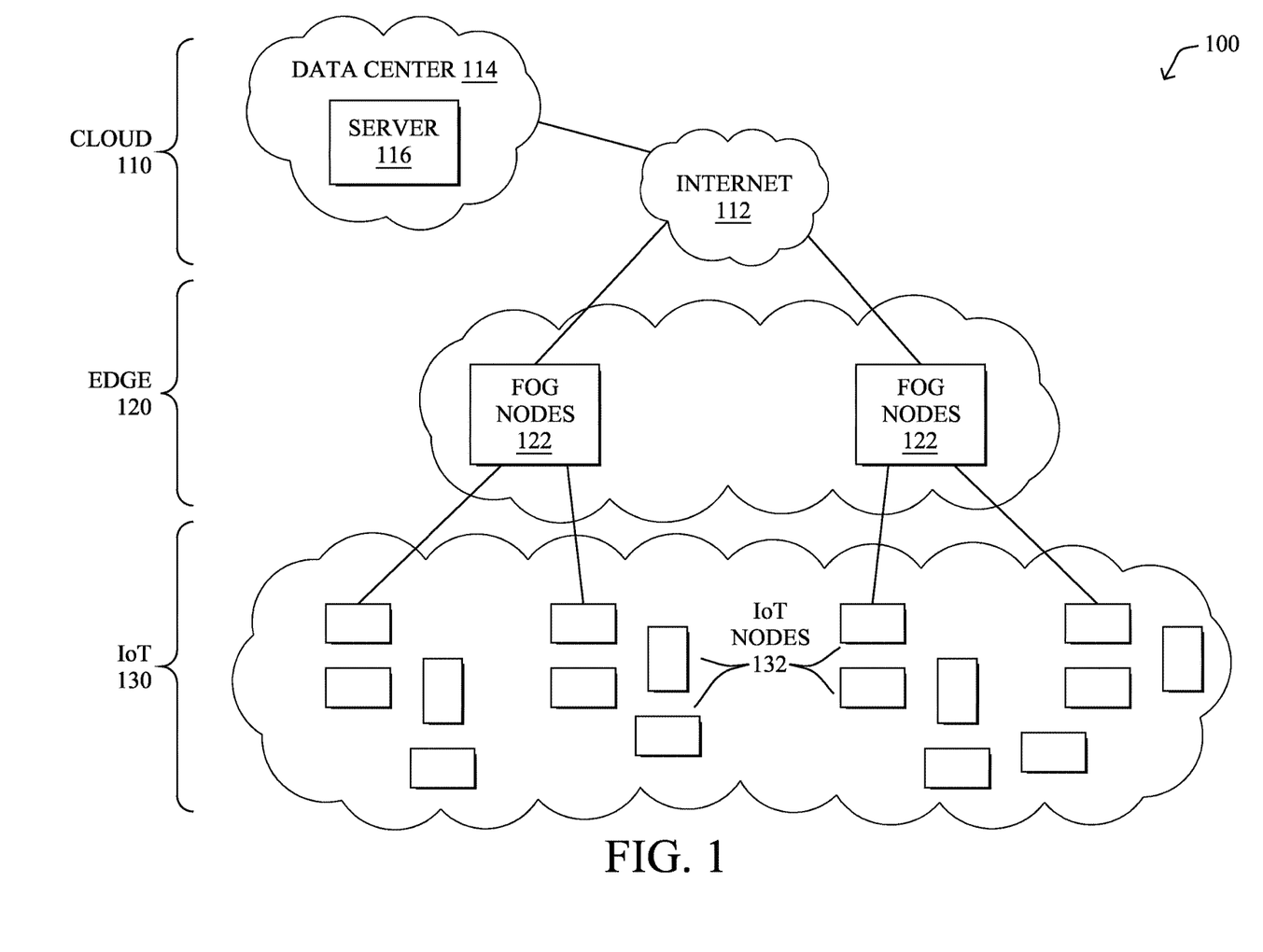
FIG. 1 illustrates an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
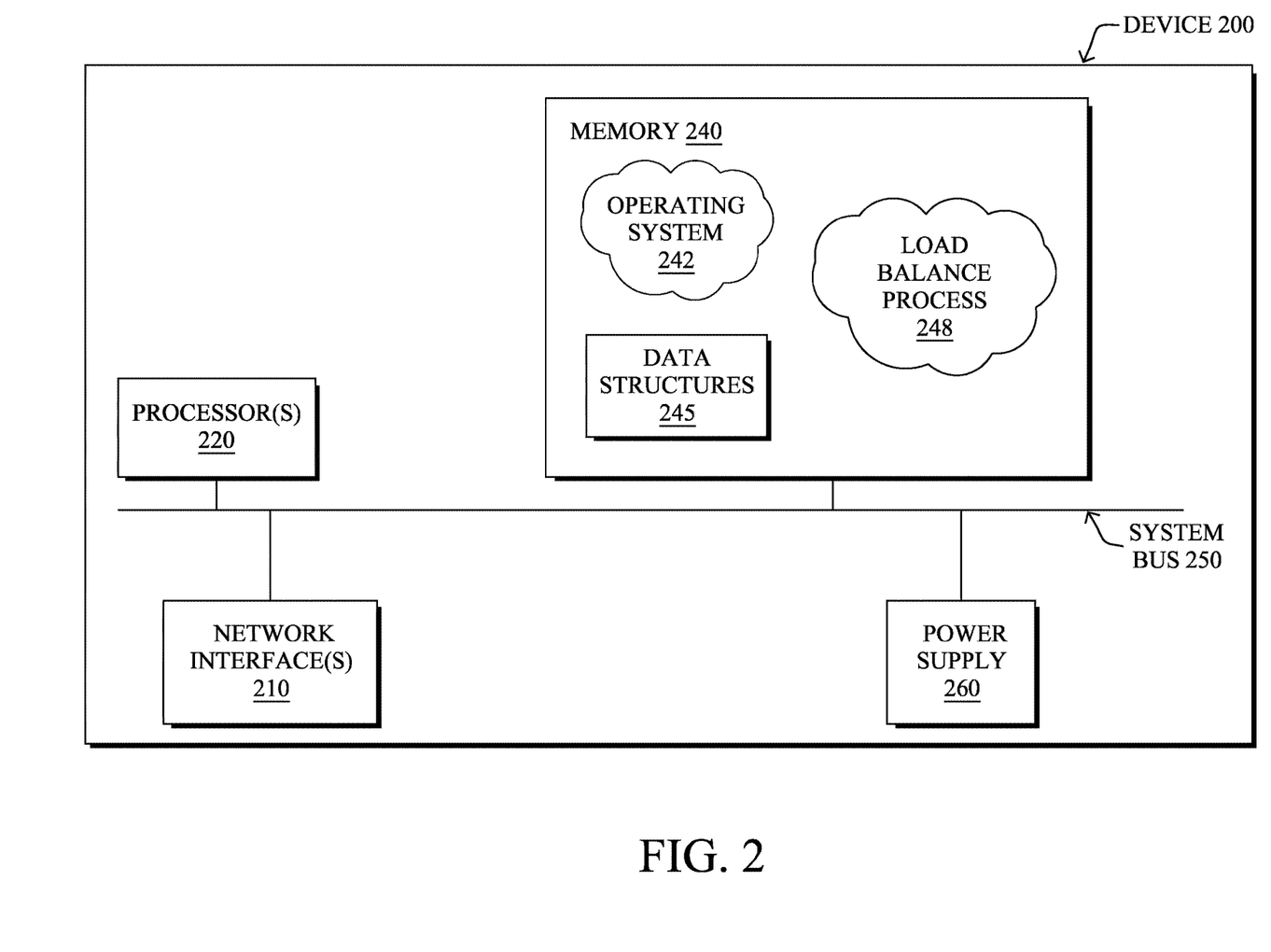
FIG. 2 illustrates an example network device/node.

FIG. 2 is a schematic block diagram of an example node/device 200 (e.g., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.). In various embodiments, node/device 200 may take the form of a networking device, such as a switch, router, or the like.

Communication interface(s) 210 include the mechanical, electrical, and signaling circuitry for communicating data over a communication link. To this end, communication interface(s) 210 may be configured to transmit and/or receive data using a variety of different communication protocols, such as Ethernet, TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a load balance process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
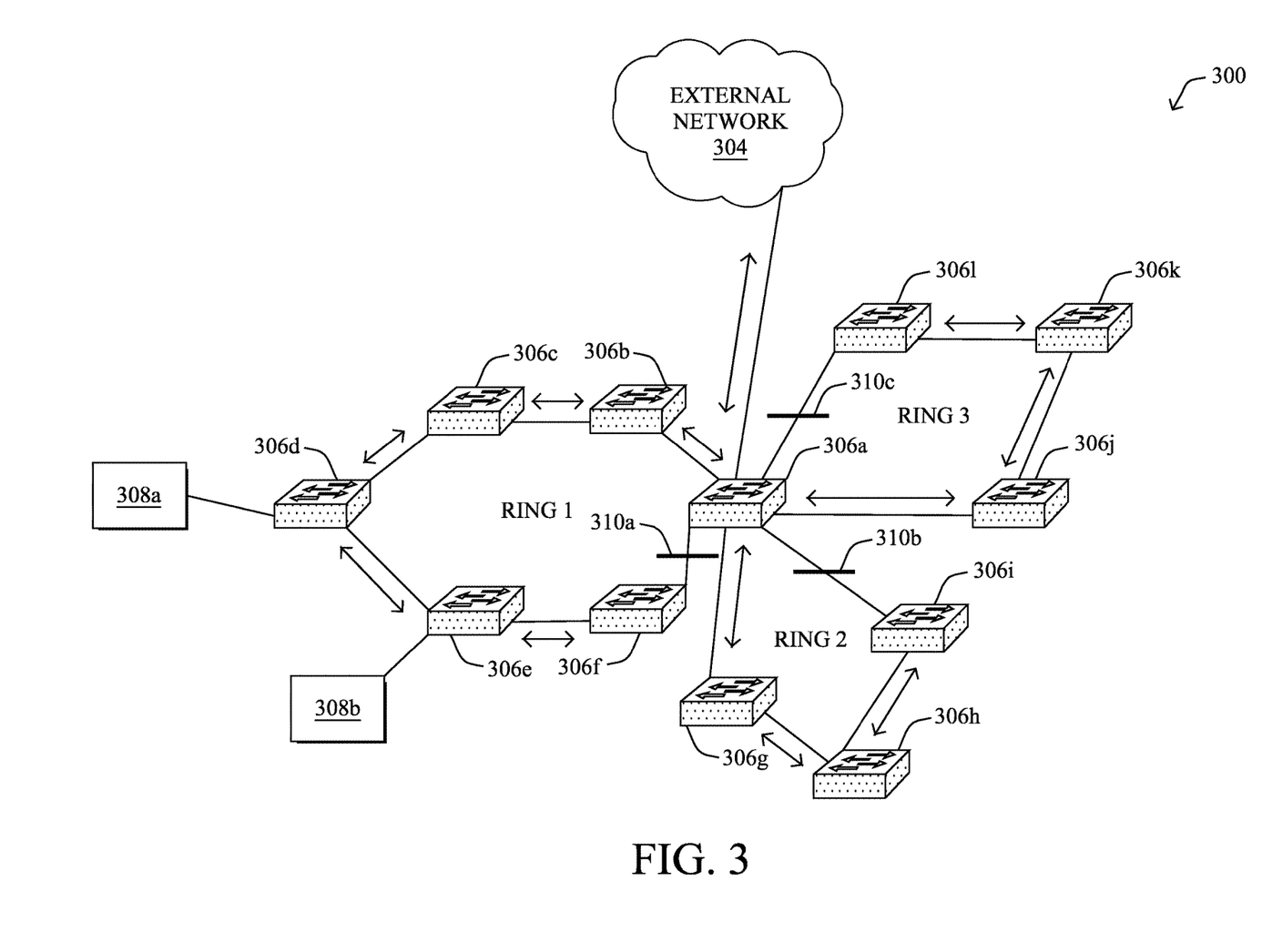
FIG. 3 illustrates an example network comprising ring networks.

It is common in many Operational Technology (OT) networks to include networking devices (e.g., switches, routers, etc.) arranged in a ring topology, to connect to other rings and/or endpoints such as sensors, input/output (I/O) devices, and the like, thereby providing connectivity back to the enterprise. FIG. 3 illustrates an example network 300 that includes such rings, in one embodiment.

More specifically, as shown in FIG. 3, network 300 may comprise any number of networking devices 306, such as networking devices 306a-306l (e.g., Ethernet switches, etc.), which provide connectivity between endpoints 308, such as 308a-308b, and an external network 304. For instance, endpoints 308a-308b may take the form of sensors, actuators, moving nodes (e.g., vehicles, mine carts, etc.), human-machine-interfaces, controllers, or the like.

In various embodiments, networking devices 306a-306l may be interconnected to form one or more rings (e.g., ring topologies). In a simple deployment, the network may include only a single ring. However, in many real-world deployments, the network will typically include multiple rings. Various layouts are also possible, such as the rings sharing one or more networking devices that functions as a gateway to provide connectivity to the external network, one ring being in between another ring and the external network, or the like.

For example, in FIG. 3, each of the rings (e.g., Ring 1, Ring 2, Ring 3) may form a segment of network 300. More specifically, networking devices 306a, 306b, 306c, 306d, 306e, and 306f may form a first ring network segment of network 300, while networking devices 306a, 306g, 306h, and 306i may form a second ring network segment of network 300, and networking devices 306a, 306j, 306k, and 306l may form a third ring network segment of network 300. Such a topology is commonly used in the case of Ethernet rings, although the techniques herein could be used in other compatible networks, as well.

In various embodiments, each of the rings may include a networking device that operates as a supervisory networking device for that ring. As shown, each of the rings in network 300 may share a common, supervisory networking device 306a, which also functions as the gateway for those rings, to communicate with external network 304. However, as noted, other topologies are also possible, and there may be multiple supervisory nodes, in other cases. In other words, in some embodiments, each of the rings may include a supervisory networking device that is distinct from the supervisory networking device of the other rings.

In general, a supervisory networking device, such as supervisory networking device 306a, may perform various supervisory functions for a ring that could include any or all of the following (among others): managing the configuration of the ring network, managing network traffic distribution on the ring network, monitoring the health and integrity of the ring, and/or managing reconfiguration of the ring to convergence, in the event of a detected fault within the ring network.

Of course, supervisory networking device 306a may include a plurality of network ports. For example, for each ring that supervisory networking device 306a manages, supervisory networking device 306a may include at least a pair of network ports acting as opposing communication endpoints for the ring. The pair of ports may be network edge ports for the ring network segment.

Each port of the pair of ports of supervisory networking device 306a for a ring network may be communicatively coupled to the ring network. Therefore, each ring network may be conceptualized as a network communication ring extending from a first port of the supervisory networking device 306a, through the intervening networking devices 306 of that ring, to a second port of the supervisory networking device 306a. As such, the ring topology may provide inherent communication redundancy among supervisory networking device 306a and intervening networking devices 306 of the ring by providing distinct communication links between networking devices 306b-306l and the distinct network ports of the supervisory networking device 306a. In this manner, supervisory networking device 306a may provide multiple potential communication routes for network traffic through the ring network utilizing distinct communication links.

However, in order to break the network traffic loop that can result from a ring topology, supervisory networking device 306a can configure one of its network ports for the ring as an alternate port. For example, supervisory networking device 306a may prevent one of its two ports from being used to forward frames, for each of its ring networks. This can be done by supervisory networking device 306a logically blocking that alternate port within the ring.

By way of example of the blocking of ports in network 300, each ring (Ring 1, Ring 2, Ring 3) in network 300 is illustrated with such a communication link block 310a-310c. Communication link blocks 310a-310b represent a logical interruption to the ability of the ring to communicate network traffic across the blocked communication link communicatively coupled to the corresponding port of supervisory networking device 306a that is configured not to forward the frames. Again, this blocking may be part of the normal operation of a ring network in order to prevent traffic loop formation.

As described above, a ring topology can inherently afford additional resiliency against a link failure. More specifically, when a link failure is detected within a ring, the blocked port of the supervisory networking device for that ring can be unblocked, thereby creating an alternate path for the traffic.

Thus, as shown in FIG. 3, blocked communication links 310a-310c and corresponding network ports of supervisory networking device 306a may be logically blocked for their respective rings, until a link failure is detected in that ring. For instance, in Ring 1 assume that the communication link between supervisory networking device 306a and networking device 306b is severed. In such a case, supervisory networking device 306a can still communicate with networking device 306b by sending its traffic in the opposite direction via networking device 306f, networking device 306e, networking device 306d, and networking device 306c if it removes communication link block 310a and reconfigures its corresponding port to begin forwarding the frames for 306b. Similarly, networking devices 306b-306f may be reconfigured to send their outgoing traffic in the direction towards the now-unblocked link between networking device 306f and supervisory networking device 306a, as well.

To ensure fast convergence in the case of a link failure in a ring network, networking devices 306 may employ the use of a ring-control protocol, such as the Device Level Ring (DLR), Media Redundancy Protocol (MRP), Ethernet Automatic Protection Switching (EAPS), or the like. For instance, networking devices 306a-306l may use DLR, MRP, EAPS, etc. to handle the detection and signaling of link failures, and ensure quick network convergence, through the control over their ports. More specifically, under DLR, MRP, EAPS, etc., at least one port of a networking device may be designated as an alternate port and placed into a blocked state for each Virtual LAN (VLAN). When a link failure is detected, the alternate port can be activated, thereby ensuring connectivity.

Figure 4A:
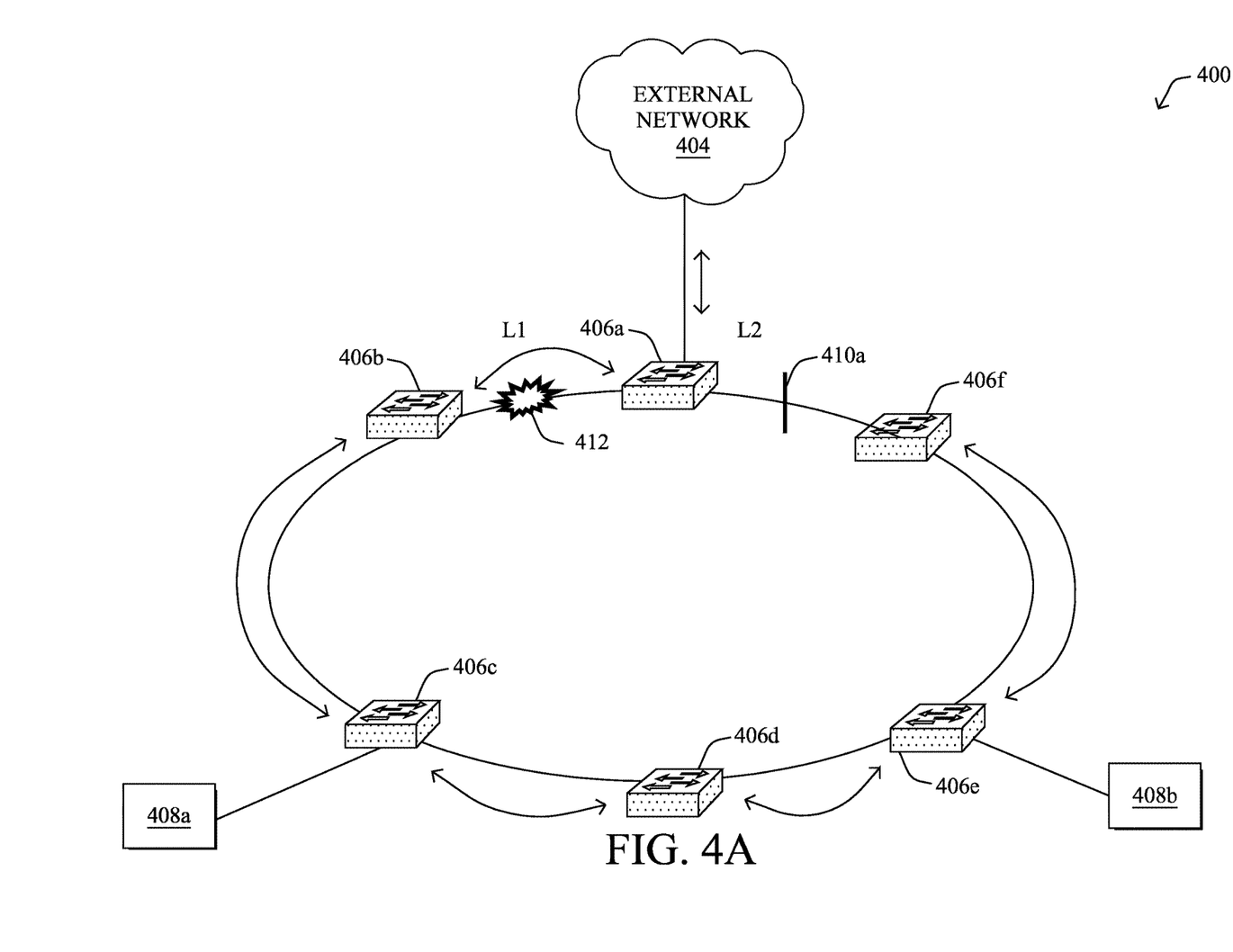
FIGS. 4A-4B illustrate an example of the detection of a fault and fault response in a ring network.
Figure 4B:
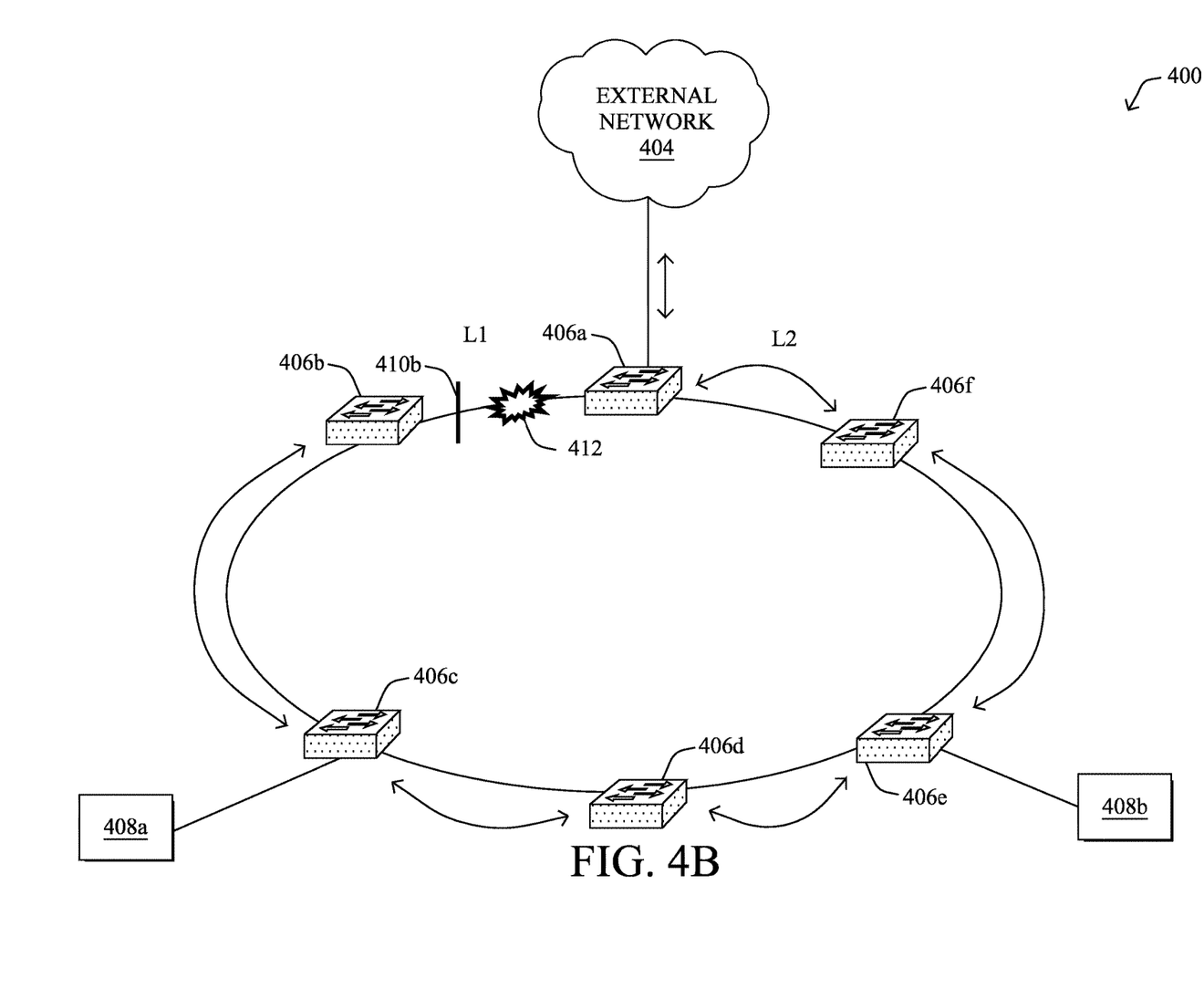

FIGS. 4A and 4B illustrate an example of fault detection and fault response in a network 400 having a ring topology, in accordance with various embodiments. In FIG. 4A, the supervisory networking device 406a is a gateway to external network 404. The supervisory networking device 406a includes a pair of ports for communicating with the other networking devices 406b-406f and/or endpoints 408a-408b of the ring over respective communication links (e.g., L1 and L2).

Network 400 is illustrated having a ring topology configured with communication block 410a on the port of supervisory networking device 406a connected to communication link L1. As described above, block 410a may be a logical block of network traffic communication over communication link L1 and the result of, for example, a configuration of a corresponding communicably coupled port of supervisory networking device 406a being configured to prevent the forwarding of frames by the port.

As a result of block 410a, the network traffic for the ring may be communicated along the only remaining available path, communication link L2, between the supervisory networking device 406a and the networking devices 406b-406f. Communication link L1 may be considered as an alternate communication link held in reserve to be unblocked and utilized in the event of a fault at communication link L2.

The supervisory networking device 406a monitors the health of the ring. Monitoring the health of the ring may include monitoring for the presence, absence, timing, etc. of frames, messages, signals, etc. indicative of the integrity of the ring. For instance, say that communication link L2 exhibits a fault 412 (e.g., the physical cable is severed, etc.). In such a case, networking device 406b may detect such a fault 412 and signal the fault 412 to the other networking devices 406 in the ring, including supervisory networking device 406a.

FIG. 4B, illustrates an example fault response initiated by supervisory networking device 406a, on receipt of an indication that a fault 412 has been detected along communication link L2. In response, supervisory networking device 406a may remove communication block 410a from communication link L1 and place communication block 410b on communication link L2. For example, supervisory networking device 406a may have reconfigured its ports to allow the port previously forbidden from forwarding frames along communication link L1 to begin forwarding frames and to forbid the port previously allowed to forward frames along communication link L2 from forwarding anymore frames along communication link L2. In addition, supervisory networking device 406a may also signal this changeover to the other networking devices 406b-406f in the ring. As such, network traffic to and from the ring may now be communicated along the unblocked communication link L1 and be blocked from being communicated along communication link L2. The block from communicating along L2 may be a result of the fault. For instance, there may be no logical blocking on either L1 or L2 in such examples in order to maintain connectivity between all networking devices. However, fault 412 itself may block communication along L2.

As noted above, the blocking scheme in network rings breaks the network traffic loop while affording additional resiliency against a link failure. However, since supervisory networking device 406a typically also acts as the gateway to external network 404, the practice of blocking network traffic on one of the two potential communication links leads to all of the traffic entering or exiting the ring network being pushed along the only available remaining path (e.g., along the unblocked link). Routing all of the network traffic for the ring network through the same link can lead to link congestion and suboptimal bandwidth optimization in the ring network. This problem can become much more pronounced in scenarios where the same supervisory networking device acts as the supervisory networking device for multiple rings including hundreds of network devices. This is becoming the norm, as more and more devices that were traditionally not part of the network are being brought online due to the proliferation of the IoT.

In addition, since all the network devices of a ring are always communicating utilizing a single one of the communication links, they may all need to be reconfigured in the event of a fault to that communication link. For example, with a ring topology, the worst-case convergence time is the time taken for convergence when the fault 412 happens along the unblocked communication link between the supervisory networking device and a first networking device of the ring (e.g., networking device 406b). In this situation, all traffic to and from all the networking devices 406b-406f of the ring has to be re-routed to take the link which was previously blocked and now is unblocked. As such, a worst-case or maximum convergence time for the ring may result.

Position Aware Load Balancing in a Ring Network

The techniques herein introduce a position aware load balancing mechanism in a ring network. In some aspects, the position aware load balancing mechanism can balance loads across ring topology networks to optimize available bandwidth utilization in the ring. In further aspects, the position aware load balancing mechanism can also reduce the worst-case convergence time in case of a fault by half over a traditional ring network configuration.

Illustratively, the techniques described herein may be performed by hardware, software, and/or firmware, such as in accordance with load balance process 248, which may include computer executable instructions executed by the processor 220 (or independent processor of interfaces 210) to perform functions relating to the techniques described herein.

Specifically, according to one or more embodiments of the disclosure, a supervisory networking device in an Ethernet ring obtains identity information for each of a plurality of other networking devices in the Ethernet ring. The supervisory networking device determines, based on the identity information, a relative position for each of the plurality of other networking devices in the Ethernet ring. The supervisory networking device generates, based on the relative position of each of the plurality of other networking devices in the Ethernet ring, a load balancing configuration for the Ethernet ring. The supervisory networking device implements the load balancing configuration in the Ethernet ring by blocking a first link of the supervisory networking device for a first subset of the plurality of other networking devices and a second link of the supervisory networking device for a second subset of the plurality of other networking devices.

Figure 5:
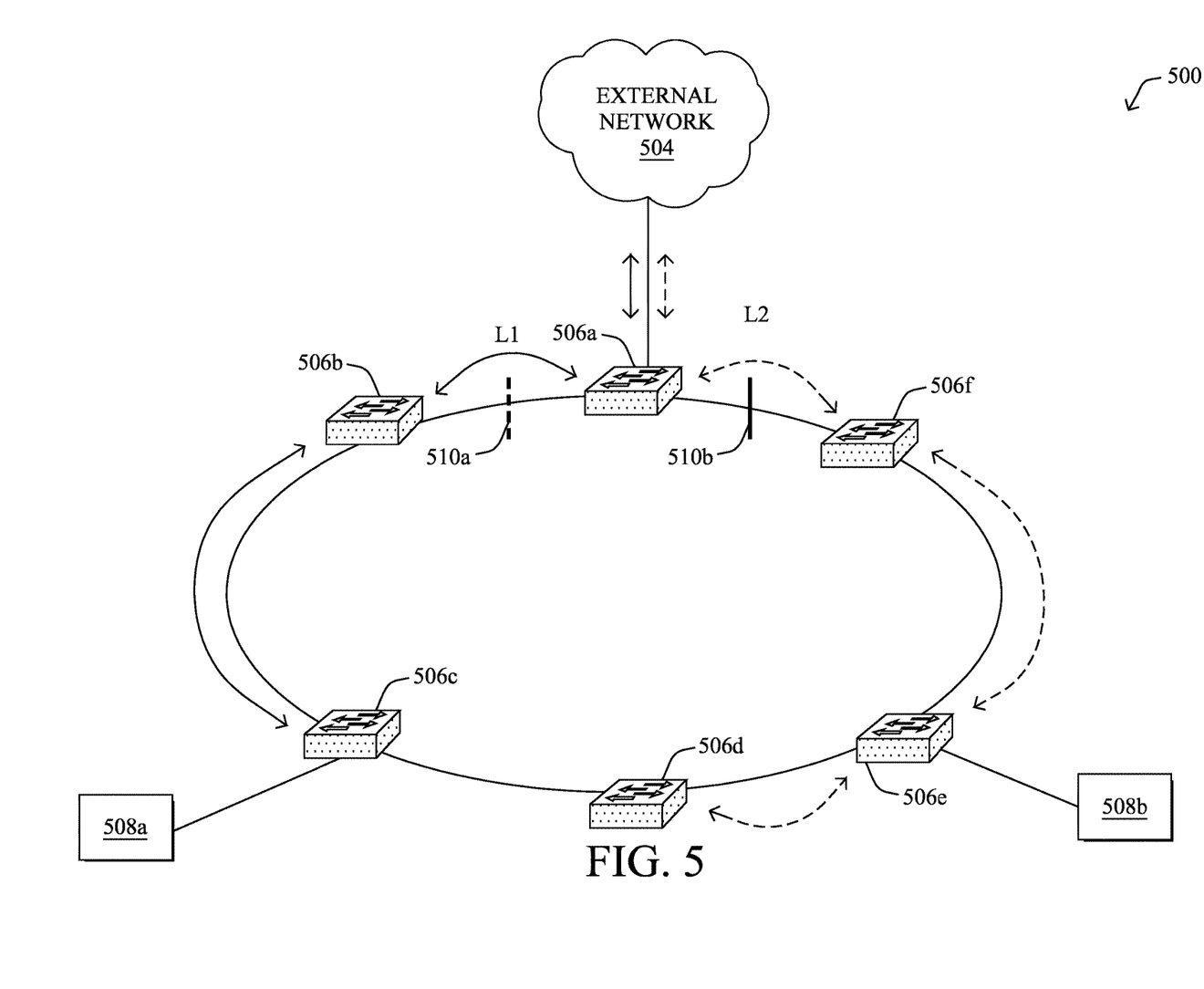
FIG. 5 illustrates an example of a position aware load balancing technique.

Operationally, and according to various embodiments, supervisory networking device 506a illustrated in FIG. 5 may implement a position aware load balancing mechanism in ring topology network 500. In FIG. 5, supervisory networking device 506a may manage data traffic communication on the ring that it is supervising. Supervisory networking device 506a may also be communicatively coupled to the ring via two communication links L1 and L2. Each of communication links L1 and L2 may carry network traffic to and/or from a respective port of supervisory networking device 506a. Supervisory networking device 506a may act as a gateway to an external network 504.

Supervisory networking device 506a may obtain identity information for each of networking devices 506b-506f in the ring. Obtaining identity information may include sending and/or receiving frames to and/or from each of networking devices 506b-506f in the ring. For example, supervisory networking device 506a may leverage Announce frames, Beacon frames, Sign_On frames, etc. communicated within the ring, to obtain identity information for each of networking devices 506b-506f in the ring.

The identity information may include data about each of the networking devices 506b-506f. For example, the identity information may include data indicative of an address of the corresponding networking device, such as a MAC address of the corresponding networking device 506. In various embodiments, the identity information may also include data indicative of a position of corresponding networking device 506 within the ring relative to supervisory networking device 506a and/or other networking devices 506 within the ring. For example, in some embodiments, the identity information may include an offset of corresponding networking device 506 from supervisory networking device 506a and/or other networking devices 506 within the ring. In further embodiments, supervisory networking device 506a may obtain the position information for the other networking devices 506 from another source, such as a database, a user interface, or the like.

Supervisory networking device 506a may determine the relative position of each of the networking devices 506b-506f in the ring based on the obtained identity information for each of the networking devices 506. Determining the relative position may include identifying the order of each of the networking devices 506b-506f in the ring relative to the supervisory networking device 506a and/or relative to the other networking devices 506b-506f. For example, supervisory networking device 506a may utilize the identity information of networking device 506b to determine that networking device 506b is a first neighboring networking device with the closest relative position to supervisory networking device 506a in a particular direction of data flow (e.g., along communication link L2. Supervisory networking device 506a may also utilize the identity information of networking device 506c to determine that networking device 506c is a second neighboring networking device with the second closest relative position to the supervisory networking device 506a in the particular direction of data flow. Supervisory networking device 506a may further utilize the identity information of networking device 506d to determine that networking device 506d is a third neighboring networking device with the third closest relative position to supervisory networking device 506a in the particular direction of data flow. Supervisory networking device 506a may continue this process for the remaining networking devices 506 in the ring, until it has determined the ordering of the networking devices 506: supervisory networking device 506a H networking device 506b H networking device 506c H networking device 506d H networking device 506e H networking device 506f.

In various embodiments, for simplicity, supervisory networking device 506a may characterize the determined relative position of each of the networking devices 506a-506f within the ring utilizing a number identifier of a relative position within the ring. For example, supervisory networking device 506a may characterize itself as node N1, networking device 506b as node N2, networking device 506c as node N3, networking device 506d as node N4, networking device 506e as node N5, and networking device 506f as node N6.

In various embodiments, supervisory networking device 506a may then utilize the relative position of each of the networking devices 506b-506f to generate a load balancing configuration for the ring. For example, supervisory networking device 506a may utilize its knowledge of the relative position of each of networking devices 506b-506f, to generate a load balancing configuration that evenly distributes network traffic across the two communication links L1 and L2 (and its corresponding ports) that connect supervisory networking device 506a to the other members of the ring. In other words, in contrast to traditional ring network operation where one of the communication links/ports of supervisory networking device 506a is blocked to all traffic to and from networking devices 506b-506f, supervisory networking device 506a may generate a load balancing configuration that implements a position aware load balancing scheme, to distribute the network traffic across both of communication links L1 and L2.

In some embodiments, supervisory networking device 506a may generate a relative position-based load balancing configuration by dividing networking nodes 506b-506f into a plurality of subsets. Network traffic to and/or from a first subset of networking nodes 506b-506f may be communicated across communication link L2 and blocked from communication across a communication link L1 in the load balancing configuration. Conversely, network traffic from and/or to second subset of the networking nodes 506b-506f may be communicated across a communication link L1 and blocked from communication across a communication link L2 in the load balancing configuration.

Here, supervisory networking device 506a may determine which of networking devices 506a-506f to assign to the first subset and which to assign to the second subset based on their determined relative positions. In various embodiments, supervisory networking device 506a may utilize the above-described number identifier of relative position within the ring of each of networking devices 506b-506f to determine which to assign to the first subset and which to assign to the second subset.

For example, the subsets may be defined as follows in a ring network consisting of x-number of networking devices (including a supervisory networking device), with supervisory networking device being node N1, communication link L2 being the link between node N1 and node N2, and communication link L1 being the link between node N1 and node Nx. If x is an odd number, the first subset may include nodes N2 to N(x+1)/2 and the second subset may include nodes N(x+3)/2 to node Nx. Alternatively, if x is an even number, the first subset may include nodes N2 to N(x)/2 and the second subset may include nodes N(x+2)/2 to node Nx.

Supervisory networking device 506a may generate a relative position-based load balancing configuration by determining how to configure network traffic to and/or from each of networking devices 506b-506f based on to which of the subsets the sending or receiving networking device of network traffic belongs. For example, if x is an odd number, the network traffic directed to nodes N2 to N(x+1)/2 (e.g., the first subset) utilizes link L2 and the traffic directed to nodes N(x+3)/2 to node Nx (e.g., the second subset) utilizes link L1. In such examples, the traffic received from nodes N2 to N(x+1)/2 (e.g., the first subset) is blocked at link L1 and traffic received from nodes N(x+3)/2 to node Nx (e.g., the second subset) is blocked at link L2 to prevent a traffic loop.

Conversely, if x is an even number, the network traffic directed to nodes N2 to N(x)/2 (e.g., the first subset) utilizes link L2 and the traffic directed to nodes N(x+2)/2 to node Nx (e.g., the second subset) utilizes link L1. In such examples, the traffic received from nodes N2 to N(x)/2 (e.g., the first subset) is blocked at link L1 and traffic received from nodes N(x+2)/2 to node Nx (e.g., the second subset) is blocked at link L2 to prevent a traffic loop.

Extending this example to the illustration in FIG. 5, ring topology network 500 includes an even number of six networking devices 506a-506f. As described above, supervisory networking device 506a may be characterized as node N1, networking device 506b as node N2, networking device 506c as node N3, networking device 506d as node N4, networking device 506e as node N5, and networking device 506f as node N6. As such, supervisory networking device 506a will assign networking devices 506b-506c to the first subset of networking devices and networking devices 506d-506f to the second subset of networking devices.

In various embodiments, supervisory networking device 506a may then implement the generated load balancing configuration by configuring the ring so that all incoming and outgoing network traffic directed to and from networking devices 506b-506c is sent via communication link L2. In addition, supervisory networking device 506a may install a logical block on its port, to implement a block 510b on communication link L1 from being used for this traffic. In other words, traffic associated with the first subset of networking devices 506 (e.g., networking devices 506b-506c) will utilize communication link L2 through the selective blocking of communication link L1.

Similarly, for the second subset of networking devices 506, supervisory networking device 506a may configure the ring so that all incoming and outgoing network traffic for the second subset (e.g., networking devices 506d-506f) is sent via communication link L1. This can be done by selectively installing a block 510a on communication link L2, thereby preventing it from being used for this traffic. As such, both communication links L1 and L2 may be simultaneously utilized to load balance traffic across the ring without introducing a traffic loop.

In addition, since the network traffic to and/or from only a subset of networking devices 506b-506f utilizes a given link/port of supervisory networking device 506a, the network convergence time after a fault may be reduced as only a subset of networking devices 506b-506f needs to be re-routed. For example, if the traffic to only half of networking devices 506b-506f uses a given link, in case of fault, the traffic to at most half of the nodes need to be re-routed via the other link. The distance between the blocked link and the farthest node will be halved and, therefore, the time required to notify all nodes to redirect traffic will also be halved. This reduction in convergence time may become more pronounced in larger rings of networking devices.

In some embodiments, the position aware load balancing approach may be implemented with respect to unicast traffic on the ring. That is, in some cases, only unicast traffic of networking devices 506b-506f will be subject to the load balancing mechanism. Multicast and/or broadcast traffic of all the networking devices 506b-506f may continue to be forwarded on one communication link and blocked on the other, since the destination networking device and hence the position of the destination networking device is unknown.

Figure 6:
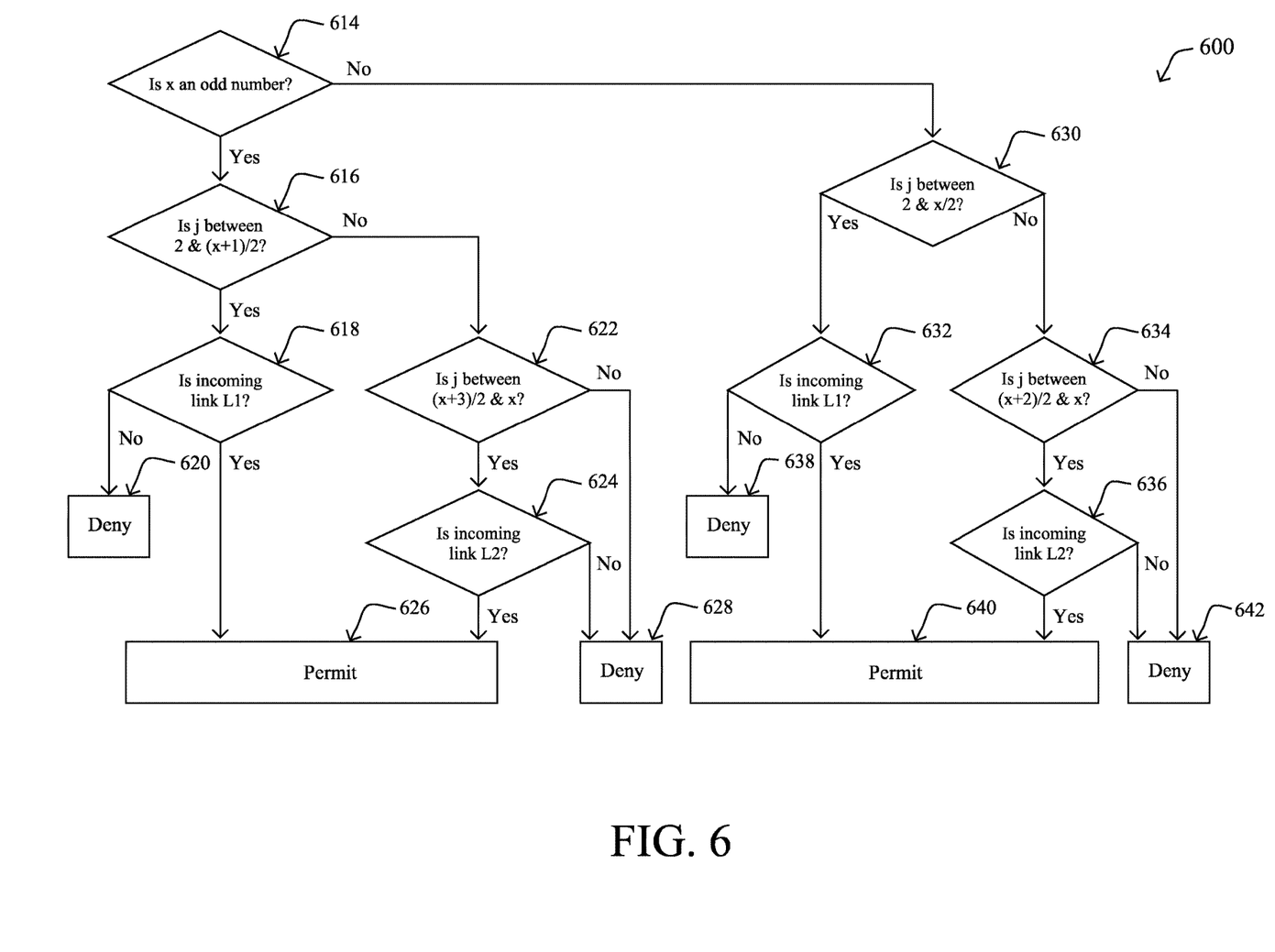
FIG. 6 illustrates a flow diagram of an example of a load balancing process.

FIG. 6 illustrates a flow diagram of an example of a load balancing process 600, according to various embodiments. In some embodiments, load balancing process 600 may be a process flow of a permit/deny logic executed on the supervisory networking device in order to determine which network traffic to permit or deny on which communication link.

At 614, load balancing process 600 may include determining whether x, the quantity of networking devices in a ring network including the supervisory networking device, is an odd number. If it is determined that x is an odd number ("Yes"), then load balancing process 600 may proceed to 616.

At 616, load balancing process 600 may include determining whether j, the relative position (e.g., a numerical identifier thereof) of the sending networking device is between 2 and (x+1)/2. If it is determined that j is between 2 and (x+1)/2 ("Yes"), then load balancing process may proceed to 618.

At 618, load balancing process 600 may include determining whether the network traffic being sent is incoming on communication link L2. If it is determined that the network traffic is not incoming on communication link L2 ("No"), then load balancing process 600 may proceed to 620 where the network traffic is denied. Alternatively, if it is determined that the network traffic is incoming on communication link L2 ("Yes"), then load balancing process 600 may proceed to 626 where the network traffic is permitted.

Returning to 616, if it is determined that j is not between 2 and (x+1)/2 ("No"), then the process may proceed to 622. At 622, load balancing process 600 may include determining whether j is between (x+3)/2 and x. If it is determined that j is between (x+3)/2 and x ("Yes"), then load balancing process 600 may proceed to 624.

At 624, load balancing process 600 may include determining whether the network traffic being sent is incoming on communication link L1. If it is determined that the network traffic is not incoming on communication link L1 ("No"), then load balancing process 600 may proceed to 628 where the network traffic is denied. Alternatively, if it is determined that the network traffic is incoming on communication link L1 ("Yes"), then load balancing process 600 may proceed to 626 where the network traffic is permitted.

However, if at 622 it is determined that j is not between (x+3)/2 and x ("No"), then load balancing process 600 may proceed to 628 where the network traffic is denied.

Returning to 614, if it is determined that x is not an odd number ("No"), then load balancing process 600 may proceed to 630. At 630, load balancing process 600 may include determining whether j is between 2 and x/2. If it is determined that j is between 2 and x/2 ("Yes"), then load balancing process 600 may proceed to 632.

At 632, load balancing process 600 may include determining whether the network traffic is incoming on communication link L2. If it is determined that the network traffic is incoming on communication link L2 ("Yes"), then load balancing process 600 may proceed to 640 where the network traffic is permitted. Alternatively, if it is determined that the network traffic is not incoming on communication link L2 ("No"), then load balancing process 600 may proceed to 638 where the network traffic is denied.

Returning to 630, if it is determined that j is not between 2 and x/2 ("No"), then load balancing process 600 may proceed to 634. At 634, load balancing process 600 may include determining whether j is between (x+2)/2 and x. If it is determined that j is not between (x+2)/2 and x ("No"), then load balancing process 600 may proceed to 642 where the traffic is denied. Alternatively, if it is determined that j is between (x+2)/2 and x ("Yes"), then load balancing process 600 may proceed to 636.

At 636, load balancing process 600 may include determining whether the network traffic being sent is incoming on communication link L1. If it is determined that the network traffic is not incoming on communication link L1 ("No"), then load balancing process 600 may proceed to 642 where the network traffic is denied. Alternatively, if it is determined that the network traffic is incoming on communication link L1 ("Yes"), then load balancing process 600 may proceed to 640 where the network traffic is permitted.

Figure 7:
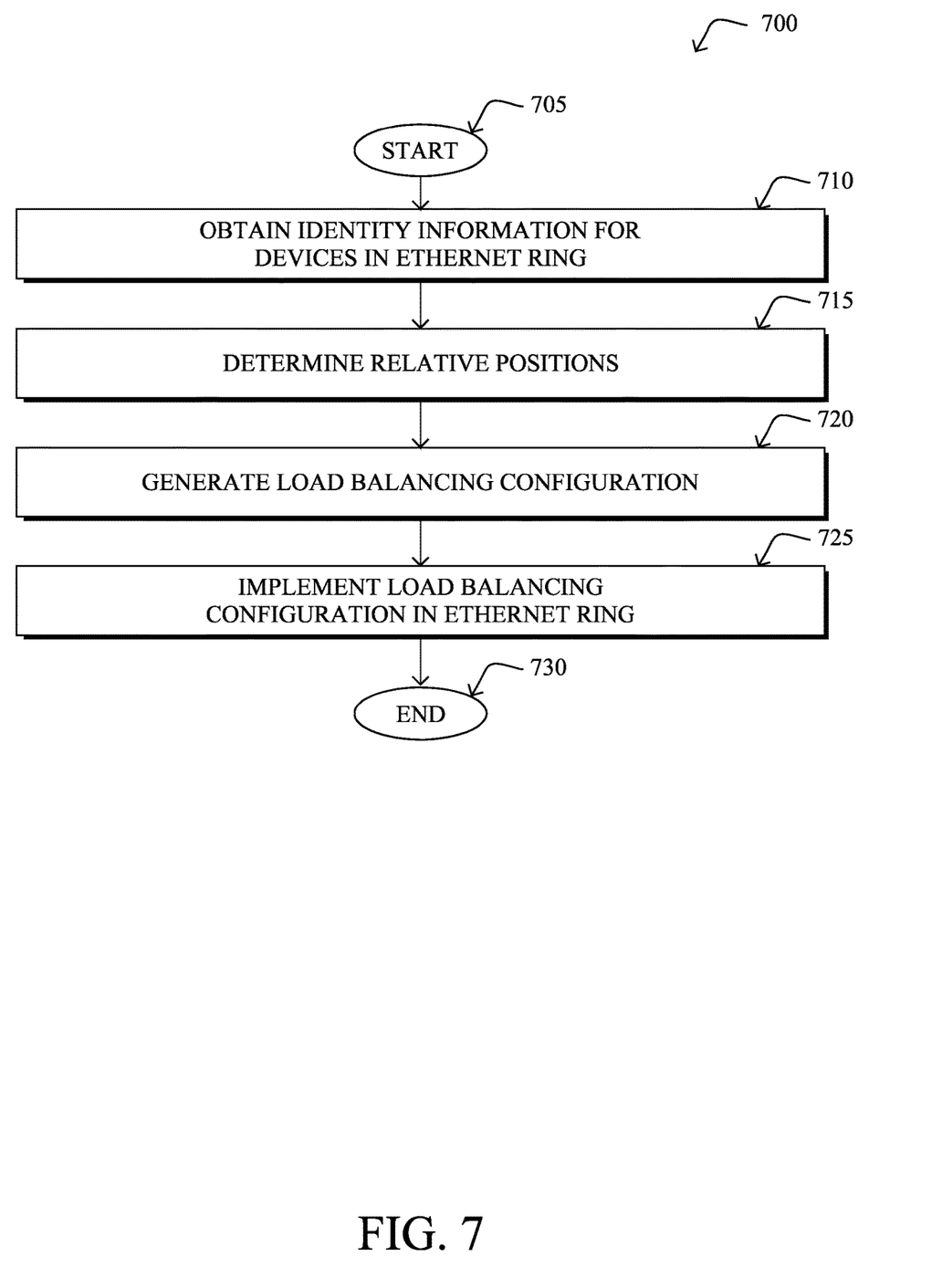
FIG. 7 illustrates an example simplified procedure for position aware load balancing.

FIG. 7 illustrates an example simplified procedure for position aware load balancing, in accordance with one or more embodiments described herein. In various embodiments, a non-generic, specifically configured networking device (e.g., device 200) may perform procedure 700 by executing stored instructions (e.g., load balance process 248). For instance, a particular networking device, such as an Ethernet switch, etc., may perform procedure 700. The procedure 700 may start at step 705, and continues to step 710, where, as described in greater detail above, a supervisory networking device in an Ethernet ring may obtain identity information for each of a plurality of other networking devices in the Ethernet ring. In one embodiment, the supervisory networking device and the plurality of other networking devices in the Ethernet ring may be Ethernet switches. In some examples, the supervisory networking device may be a gateway for the Ethernet ring to an external network. The identity information may include an Ethernet frame indicating an offset for that other networking device. Additionally, the identity information may include a media access control (MAC) address for that other networking device, in another embodiment.

At step 715, as detailed above, the supervisory device may determine, based on the identity information, a relative position for each of the plurality of other networking devices. In examples where the identity information comprises an Ethernet frame indicating an offset for that other networking device, the supervisory networking device may determine the relative position of that other networking device in the Ethernet ring based on the offset indicated in the Ethernet frame.

At step 720, the supervisory networking device may generate, based on the relative position of each of the plurality of other networking devices, a load balancing configuration for the Ethernet ring, as described in greater detail above. In general, the load balancing configuration may subdivide the devices in the Ethernet ring into two subsets.

At step 725, as detailed above, the supervisory networking device may implement the load balancing configuration in the Ethernet ring by blocking a first link of the supervisory networking device for a first subset of the plurality of other networking devices and a second link of the supervisory networking device for a second subset of the plurality of other networking devices. In some examples, the first link is blocked for the first subset for unicast traffic and the second link is blocked for the second subset for unicast traffic.

In some embodiments, the first link of the supervisory networking device may include preventing, by the supervisory networking device, traffic associated with the first subset of the plurality of other networking devices from utilizing a port of the supervisory networking device utilized for communication across the first link, configuring, by the supervisory networking device, the first subset of the plurality of other networking devices to utilize the second link. In examples where the identity information includes a media access control (MAC) address for that other networking device, the MAC address for that other networking device may be utilized to identify network traffic to be blocked.

The supervisory networking device may, in some embodiments, determine that the Ethernet ring has an even quantity of networking devices, assign a first portion of the plurality of other networking devices to the first subset based on the first portion having a numbered relative position in the Ethernet ring no greater than half of the even quantity of networking devices, and assign a second portion of the plurality of other networking devices to the second subset based on the second portion having a numbered relative position in the Ethernet ring no less than half of a sum of the even quantity of networking devices and two.

Alternatively, the supervisory networking device may determine that the Ethernet ring has an odd quantity of networking devices, assign a first portion of the plurality of other networking devices to the first subset based on the first portion having a numbered relative position in the Ethernet ring no greater than half of a sum of the odd quantity of networking devices and one, and assign a second portion of the plurality of other networking devices to the second subset based on the second portion having a numbered relative position in the Ethernet ring no less than half of a sum of the odd quantity of networking devices and three.

In some examples, the supervisory networking device may detect a fault along the first link of the supervisory networking device and unblock the second link of the supervisory networking device for the second subset of the plurality of other networking devices responsive to detecting the fault. While this example provides for detection of the fault in the first link of the supervisory node, the fault may, in various embodiments, be detected anywhere along the Ethernet ring. Additionally, the first link of the supervisory networking device may be and/or remain unblocked such that after a fault is detected there is no blocking anywhere in the Ethernet ring in order to maintain connectivity between all the networking devices. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, utilize knowledge of the relative position of each of the networking device members of a ring network in order to implement position aware load balancing that evenly distributes the network traffic across two links connecting a supervisory networking device to the other members of the ring. In addition to load balancing the ring network, the techniques described herein reduce convergence time in the event of a fault as a result of reducing the quantity of networking devices requiring notification and/or redirection following the fault.

While there have been shown and described illustrative embodiments for a position aware load balancing mechanism for distributing network traffic in a ring network and reducing convergence time in the event of a fault, it is to be understood that various other adaptations and modifications may be made within the intent and scope of the embodiments herein. For instance, while the techniques herein are primarily described with respect to an Ethernet ring, the techniques herein are not limited as such and can be applied to any form of communication network that uses a ring topology.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    obtaining, by a supervisory networking device in an Ethernet ring, identity information for each of a plurality of other networking devices in the Ethernet ring;
    determining, by the supervisory networking device and based on the identity information, a relative position for each of the plurality of other networking devices in the Ethernet ring;
    generating, by the supervisory networking device and based on the relative position of each of the plurality of other networking devices in the Ethernet ring, a load balancing configuration for the Ethernet ring; and
    implementing, by the supervisory networking device, the load balancing configuration in the Ethernet ring by blocking a first link of the supervisory networking device for a first subset of the plurality of other networking devices and a second link of the supervisory networking device for a second subset of the plurality of other networking devices.

2. The method as in claim 1, wherein the supervisory networking device and the plurality of other networking devices in the Ethernet ring are Ethernet switches.

3. The method as in claim 1, further comprising:
    detecting, by the supervisory networking device, a fault along the first link of the supervisory networking device; and
    unblocking, by the supervisory networking device, the second link of the supervisory networking device for the second subset of the plurality of other networking devices responsive to detecting the fault.

4. The method as in claim 1, wherein the identity information for each of the plurality of other networking devices comprises an Ethernet frame indicating an offset for that other networking device, and wherein the supervisory networking device determines the relative position of that other networking device in the Ethernet ring based on the offset.

5. The method as in claim 1, further comprising:
    determining, by the supervisory networking device, the Ethernet ring has an even quantity of networking devices;
    assigning, by the supervisory networking device, a first portion of the plurality of other networking devices to the first subset based on the first portion having a numbered relative position in the Ethernet ring no greater than half of the even quantity of networking devices; and
    assigning, by the supervisory networking device, a second portion of the plurality of other networking devices to the second subset based on the second portion having a numbered relative position in the Ethernet ring no less than half of a sum of the even quantity of networking devices and two.

6. The method as in claim 1, further comprising:
    determining, by the supervisory networking device, the Ethernet ring has an odd quantity of networking devices;
    assigning, by the supervisory networking device, a first portion of the plurality of other networking devices to the first subset based on the first portion having a numbered relative position in the Ethernet ring no greater than half of a sum of the odd quantity of networking devices and one; and
    assigning, by the supervisory networking device, a second portion of the plurality of other networking devices to the second subset based on the second portion having a numbered relative position in the Ethernet ring no less than half of a sum of the odd quantity of networking devices and three.

7. The method as in claim 1, wherein the first link is blocked for the first subset for unicast traffic and the second link is blocked for the second subset for unicast traffic.

8. The method as in claim 1, wherein blocking the first link of the supervisory networking device includes:
preventing, by the supervisory networking device, traffic associated with the first subset of the plurality of other networking devices from utilizing a port of the supervisory networking device utilized for communication across the first link; and
configuring, by the supervisory networking device, the first subset of the plurality of other networking devices to utilize the second link.

9. The method as in claim 1, wherein the identity information includes a media access control address for that other networking device, and wherein the media access control address for that other networking device is utilized to identify network traffic to be blocked.

10. The method as in claim 1, wherein the supervisory networking device is a gateway for the Ethernet ring to an external network.

11. An apparatus, comprising:
one or more interfaces to communicate with a plurality of networking devices in an Ethernet ring;
a processor coupled to the one or more interfaces and configured to execute one or more processes; and
a memory configured to store a process that is executable by the processor, the process when executed configured to:
obtain identity information for each of a plurality of networking devices in an Ethernet ring;
determine, based on the identity information, a relative position for each of the plurality of networking devices in the Ethernet ring;
generate, based on the relative position of each of the plurality of networking devices in the Ethernet ring, a load balancing configuration for the Ethernet ring; and
implement the load balancing configuration in the Ethernet ring by blocking a first link of the apparatus for a first subset of the plurality of networking devices and a second link of the apparatus for a second subset of the plurality of networking devices.

12. The apparatus as in claim 11, wherein the apparatus and the plurality of networking devices in the Ethernet ring are Ethernet switches.

13. The apparatus as in claim 11, wherein the process, when executed, is further configured to:
detect a fault along the first link of the apparatus; and
unblock the second link of the apparatus for the second subset of the plurality of networking devices responsive to detecting the fault.

14. The apparatus as in claim 11, wherein the identity information for each of the plurality of networking devices comprises an Ethernet frame indicating an offset for that networking device, and wherein the apparatus determines the relative position of that networking device in the Ethernet ring based on the offset indicated in the Ethernet frame.

15. The apparatus as in claim 11, wherein the process, when executed, is further configured to:
determine the Ethernet ring has an even quantity of networking devices;
assign a first portion of the plurality of networking devices to the first subset based on the first portion having a numbered relative position in the Ethernet ring no greater than half of the even quantity of networking devices; and
assign a second portion of the plurality of networking devices to the second subset based on the second portion having a numbered relative position in the Ethernet ring no less than half of a sum of the even quantity of networking devices and two.

16. The apparatus as in claim 11, wherein the process, when executed, is further configured to:
determine the Ethernet ring has an odd quantity of networking devices;
assign a first portion of the plurality of networking devices to the first subset based on the first portion having a numbered relative position in the Ethernet ring no greater than half of a sum of the odd quantity of networking devices and one; and
assign a second portion of the plurality of networking devices to the second subset based on the second portion having a numbered relative position in the Ethernet ring no less than half of a sum of the odd quantity of networking devices and three.

17. The apparatus as in claim 11, wherein the first link is blocked for the first subset for unicast traffic and the second link is blocked for the second subset for unicast traffic.

18. The apparatus as in claim 11, wherein the apparatus blocks the first link by:
preventing traffic associated with the first subset of the plurality of networking devices from utilizing a port of the apparatus utilized for communication across the first link; and
configuring the first subset of the plurality of networking devices to utilize the second link.

19. The apparatus as in claim 11, wherein the identity information includes a media access control address for that other networking device, and wherein the media access control address for that networking device is utilized to identify network traffic to be blocked.

20. A tangible, non-transitory, computer-readable medium storing program instructions that cause a supervisory networking device in an Ethernet ring to execute a process comprising:
obtaining, by the supervisory networking device in the Ethernet ring, identity information for each of a plurality of other networking devices in the Ethernet ring;
determining, by the supervisory networking device and based on the identity information, a relative position for each of the plurality of other networking devices in the Ethernet ring;
generating, by the supervisory networking device and based on the relative position of each of the plurality of other networking devices in the Ethernet ring, a load balancing configuration for the Ethernet ring; and
implementing, by the supervisory networking device, the load balancing configuration in the Ethernet ring by blocking a first link of the supervisory networking device for a first subset of the plurality of other networking devices and a second link of the supervisory networking device for a second subset of the plurality of other networking devices.

* * * * *